United States Patent [19]

Parisi

[11] Patent Number: 4,593,294

[45] Date of Patent: Jun. 3, 1986

[54] INK JET METHOD AND APPARATUS

[75] Inventor: Joseph P. Parisi, New Millford, Conn.

[73] Assignee: Exxon Printing Systems, Inc., Brookfield, Conn.

[21] Appl. No.: 725,575

[22] Filed: Apr. 22, 1985

[51] Int. Cl.[4] .............................................. G01D 15/18

[52] U.S. Cl. .................................. 346/140 R; 346/1.1

[58] Field of Search ........................... 346/1.1, 140, 75

[56] References Cited

U.S. PATENT DOCUMENTS

| | | | |
|---|---|---|---|
| 4,459,601 | 7/1984 | Howkins | 346/140 |
| 4,511,906 | 4/1985 | Hara | 346/140 |

*Primary Examiner*—Joseph W. Hartary

[57] ABSTRACT

Two ink jet modules are employed, having an ink supply system with a bubble trap chamber having level sensors. By maintaining the proper orientation of one of the modules with respect to the vertical, the other module may be placed in any orientation so as to eject droplets in any orientation from that module.

12 Claims, 3 Drawing Figures

INK JET METHOD AND APPARATUS

BACKGROUND OF THE INVENTION

This invention relates to a method and apparatus for jetting ink, and more particularly to a method and apparatus by which ink is supplied from a reservoir to one or more ink jets.

Ink jet apparatus typically employ an ink jet chamber having an orifice for ejecting droplets of ink which is supplied by an ink handling system. Ink handling systems frequently include bubble trap chambers which are adapted to prevent bubbles of air from reaching the ink jet chamber and clogging the relatively small passages leading to the chamber or causing compliance so as to reduce the effect of the "jetting" pressure pulse which would thereby interfere with the proper operation of the ink jet. Ink handling systems may also include level sensors for sensing the amount of ink in an ink supply or reservoir associated with the system. Both bubble trap chambers and level sensing typically require a particular orientation to function properly. In other words, if an ink jet apparatus employs the bubble trap chamber and/or a level sensor is inclined or inverted, the bubble trap chamber and/or the level sensing mechanism may not function properly. Ink handling systems also typically assure a predetermined and proper hydrostatic head at the ink jet chamber.

It will therefore be appreciated that it is particularly important that the ink path immediately preceding the ink jet chamber have predetermined characteristics. It is not therefore possible to simply couple an ink jet chamber to a remote ink handling system by means, for example, of a tubular connection and still achieve reliable and high performance operation of the ink jet.

SUMMARY OF THE INVENTION

It is an object of this invention to provide an ink jet apparatus and method of assembling an apparatus which may be utilized regardless of the orientation of the ink jet.

It is a more specific object of the invention to provide an ink jet apparatus and method of assembling an apparatus wherein the bubble trap chamber associated with the apparatus will function properly regardless of the orientation of the ink jet.

It is another specific object of this invention to provide and ink jet appartus and method of assembling an ink jet apparatus which has an ink level sensor which will function properly regardless of the orientation of the ink jet.

It is a further object of this invention to provide such an apparatus and such a method in a reliable manner.

It is a still further object of this invention to provide such an apparatus and such a method in a relatively low-cost manner.

It is a still further object of this invention to provide an ink jet apparatus and method of assembling such an apparatus which is capable of high performance regardless of the orientation of the ink jet.

In accordance with these and other objects of the invention, a first ink handling module includes an ink supply path adapted to communicate with a reservoir, a bubble trap chamber coupled to the ink supply path and a outlet path from the bubble trap chamber. A second ink handling module also includes an ink supply path, a bubble trap chamber coupled to the ink supply path and an outlet path from the bubble trap chamber.

In accordance with this invention, the outlet path of the first module is coupled to the inlet path of the second module, and an ink jet is coupled to the outlet of the second module.

In accordance with this invention, the orientation of the first module is maintained such that the bubble trap chamber of the first module will remain operative while the second module with the ink jet coupled thereto is oriented as required without regard to the operation of its bubble trap chamber.

In further accordance with this invention, the bubble trap chambers of the first module and the second module include level sensing means. The level sensing means of the first module remains operative due to the maintenance of the proper orientation regardless of the orientation of the second module.

In still further accordance with this invention, the inlet path of both the first module and the second module includes valve means which is open in response to the presence of an ink reservoir cartridge. A cartridge filled with ink is inserted in the first module to open the valve while a dummy cartridge may be inserted into the second module to maintain the valve in an open position.

In still further accordance with this invention, the first module is oriented with respect to the ink jet chamber so as to create a slightly negative head at the ink jet.

In still further accordance with this invention, the level sensor may comprise at least one elongated sensor element extending substantially vertically in the first module.

In still further in accordance with this invention, the first module and the second module are substantially identical.

DETAILED DESCRIPTION OF THE PREFERRED EMBODIMENTS

Figure 1:
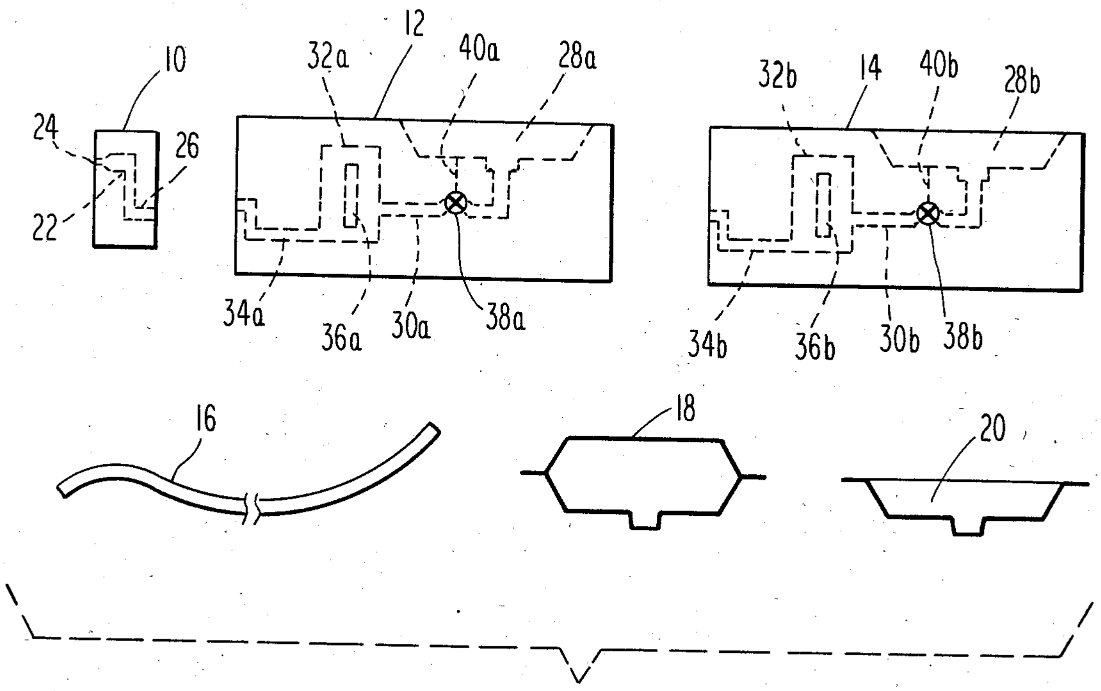
FIG. 1 is a partially schematic diagram of the components of an ink jet apparatus including ink handling modules which may be utilized in the preferred embodiment of the invention.

Referring to FIG. 1, the components of an ink jet system are disclosed. These components include an ink jet head 10, a first ink handling module 12, a second ink handling module 14, a coupling means 16, an ink supply cartridge 18 and a dummy cartridge 20. As shown, the ink jet head 10 includes at least one chamber 22 shown in phantom with an orifice 24 and inlet 26.

Each of the modules 12 and 14 provide ink handling capabilities including a receptacle **28*a* and 28*b* adapted to receive the cartridge 18, an inlet path 30*a* and 30*b* leading from the receptacle 28*a* and 28*b*, a bubble trap chamber 32*a* and 32*b* coupled to the ink inlet path 30*a* and 30*b* and an ink outlet path 34*a* and 34*b* coupled to the bubble trap chamber 32*a* and 32*b*. In addition, each of the modules 12 and 14 include level sensor means in the form of one or more elongated sensor elements 36*a* and 36*b*. A valve 38*a* and 38*b* which is located in the inlet path 30***a* and 30*b* prevents the outflow of ink in the absence of the cartridge 18. The valve 38*a* and 38*b* is operated by means of a coupling mechanism 40*a* and 40*b* which communicates with the receptacle 28*a* and 28*b*.

In order for the bubble trap chamber 32*a* and 32*b* in the level sensors 36*a* and 36*b* to function properly, it is necessary that the modules 12 and 14 be maintained in the orientation shown in FIG. 1. However, any ink jet apparatus need only have one bubble trap chamber which is functioning in that capacity. The same is also true with respect to a level sensor. It is therefore possible to couple the modules 12 and 14 together with the other components shown in FIG. 1 so long as the orientation of one bubble trap chamber and one level sensor is maintained to allow that bubble trap chamber and level sensor to function properly.

Figure 2:
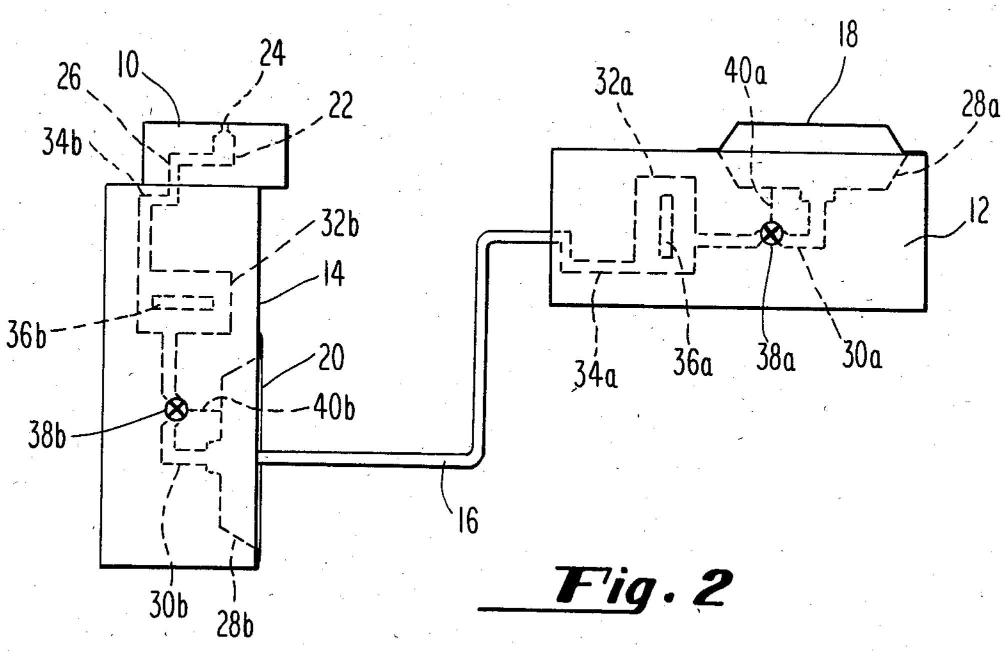
FIG. 2 is a partially schematic diagram of the modules of FIG. 1 assembled in the preferred embodiment of the invention.

Referring to FIG. 2, the module 12 with its components is maintained in the proper orientation while the module 14 is inverted with the ink jet 10 coupled thereto. As also shown in FIG. 2, the coupling 60 couples the outlet path 34*a* to the inlet path 30*b*. As long as the bubble trap chamber 32*a* and the level sensor 36*a* are in the orientation shown in FIG. 2, the module 14 may be inverted or otherwise oriented and the ink jet apparatus will still function properly with the chamber 32*b* filled with ink and the vent 50*b* closed. It is also important to know the fluidic input to the ink jet head 10 is maintained to assure high performance reliable operation. The head 10 is coupled directly to the outlet 34*b* of the module 14 which is of course adapted to be coupled to such a head.

In order for the valve 38*b* to be opened, it is necessary to insert the dummy cartridge 20 into the receptacle 28*b*. Once this is done, the ink path to the head 10 and the module 14 are filled with ink and all necessary level sensing and bubble trapping functions are performed by the module 12.

Figure 3:
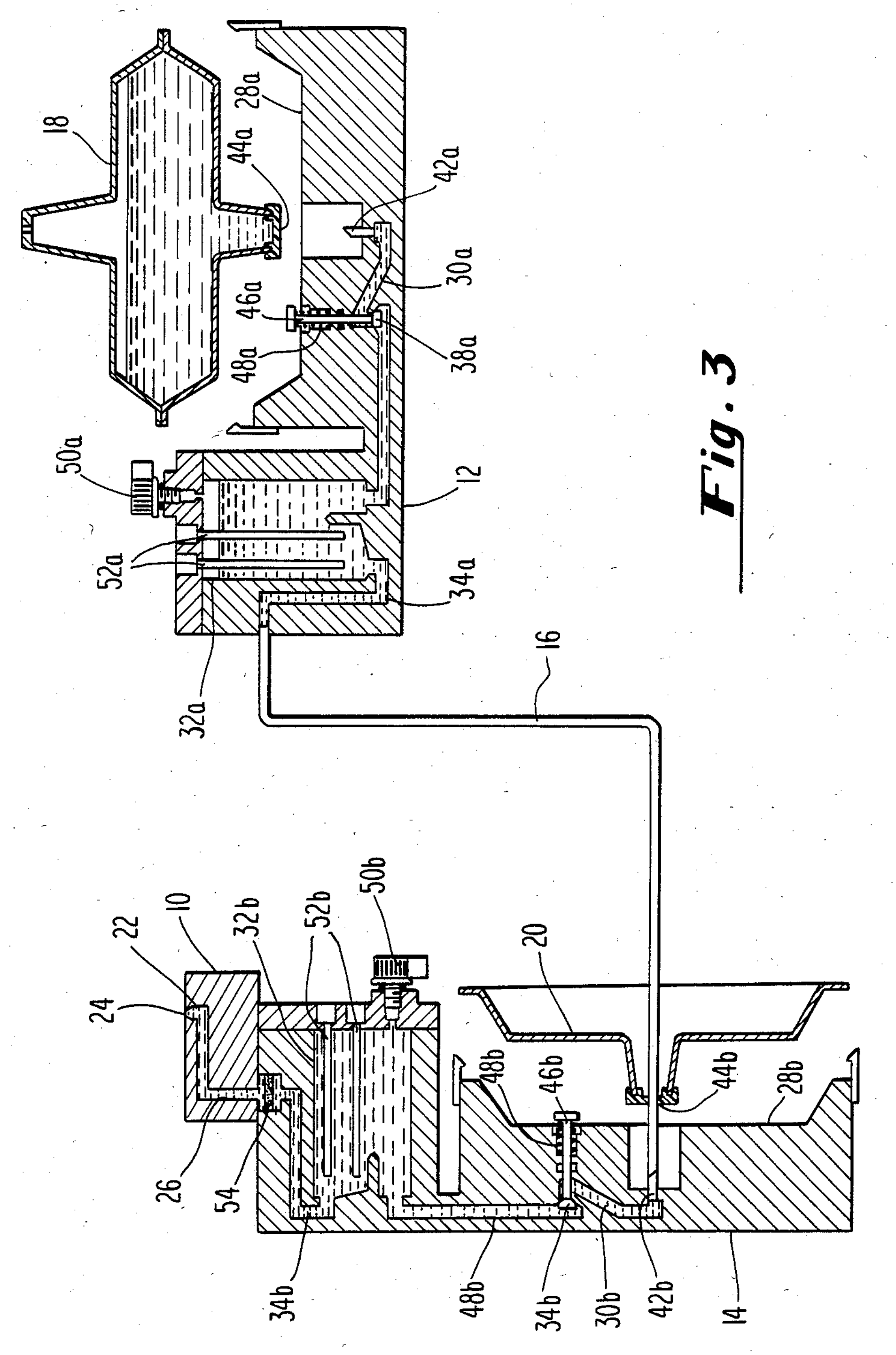
FIG. 3 is a sectional view of an ink jet apparatus in a partially exploded condition representing the preferred embodiment of the invention.

Reference will now be made to FIG. 3 for a more detailed description of the preferred embodiment of the invention. Shown in FIG. 3, the cartridge 18 the dummy 20 are not fully inserted into the modules 12 and 14 respectively. However, it will be appreciated that the ink level shown in the modules 12 and 14 corresponds with full insertion of the cartridge 18 and the dummy 20 into the appropriate receptacles 28*a* and 28*b*. In this connection, it will be noted that hollow needle-like members 42*a* and 42*b* which are coupled to the inlet paths 30*a* and 30*b* pierce septums 44*a* and 44*b* in the cartridge 18 and the dummy 20.

In addition, FIG. 3 shows in somewhat more detail the valve 38*a* and 38*b*. Each such valve comprises a stem 46*a* and 46*b* which is biased in the upper closed position by a spring 48*a* and 48*b* in the absence of cartridge 18 and the dummy 20. In the presence of the cartridge 18 and the dummy 20, the valve 30*a* and 30*b* are opened so as permit ink to flow through in the path 30*a* and 30*b*.

FIG. 3 also shows the bubble trap chamber 32*a* and 32*b* in substantially more detail. The chamber includes a bubble trap vent 50*a* and 50*b* which may be opened and closed as required in the case of module 12, the vent 50*a* will be opened so as to permit the bubble trap chamber to function properly. In the case of module 14, the vent 50*b* will be maintained closed so as to avoid ink spilling out through the vent. The bubble trap chamber 32*a* and 32*b* also would include two parallel level sensing members 52*a* and 52*b*. Finally, bubble trap chamber 32*a* and 32*b* may include a screen leading to the outlet 34*a* and 34*b* so as prevent the flow of bubbles to the ink jet head 30.

As shown in FIG. 3, the vent 50*a*, with the proper orientation for the module 12, is at a vertical extremity of the chamber 32*a*. Similarly, level sensors 52*a* are vertically disposed in the module 12. In contrast, the vent 50*b* of the module 14 is located at a horizontal extremity while the sensor elements 52*b* extend horizontally. Of course, other orientations could be utilized for the module 14 without affecting the operation of the ink jet apparatus.

Finally, it will be noted that a filter 54 is employed in the outlet path 34*b* to the head 10. Except for the filter 54, the modules 12 and 14 are identical. This substantial identity allows a single module to be utilized alone in an ink jet apparatus as disclosed in co-pending application Ser. No. 465,474, filed Feb. 10, 1983, or a pair of modules to be utilized as shown herein. Reference is also made to the aforesaid co-pending application for various details of the module, which application is incorporated herein by reference for that purpose.

It will also be understood that the orientation of the module 12 with respect to the module 14 is intended to provide the proper relative elevation such that the pressure or head at the orifice 24 is substantially zero or only slightly negative.

It will be appreciated that assembly of the apparatus shown in FIG. 3 may proceed as follows. Initially, the coupling 16 is connected between the module 12 and the module 14. The coupling is inserted through the dummy cartridge 20 and applied over the needle-like member 42*b*. Ink is then caused to flow from the module 12 to the module 14. As a result, the bubble trap chamber 32*b* is filled. The vent 50*b* may then be closed. The orientation of module 14 may then be changed without effecting the operation of the system.

Although the particular modules 12 and 14 have been shown and described in detail, it will be understood that other modules may be employed having an ink jet chamber and/or level sensor mechanism requiring a particular orientation in order for the ink handling system to function properly. Other such modules will occur to those of ordinary skill in the art.

Although the details of the head 10 have not been shown and described herein, reference, is made to U.S. patent Ser. No. 336,603, now U.S. Pat. No. 4,459,601 filed Jan. 4, 1982, which is assigned to the assignee of this invention and incorporated herein by reference. Although a particular embodiment of the invention has been shown and described, it will be understood the various modifications will occur to those of ordinary skill in the art and such modifications are intended to fall within the true spirit and scope of the invention as set forth in the appended claims.

What is claimed is:

1. Method of assembling ink handling modules for forming an ink jet system, said modules including a bubble trap chamber, an inlet to the chamber and an outlet from the chamber adapted to receive an ink jet head, said method comprising the following steps:

coupling a reservoir to the inlet of one module;

coupling the outlet from the one module to the inlet of another module;

coupling an ink jet to the outlet of the other module; and orienting said one module relative to said other module such that said bubble trap chamber of said one module is operative.

2. The method of claim 1 wherein said chamber of said one module includes reservoir level sensing means, said orienting rendering said level sensing means operative.

3. The method of claim 1 including valve means in said inlet of each said module opening in response to a presence of a reservoir cartridge, said method comprising the step of inserting a dummy reservoir cartridge in said other module and an ink filled reservoir cartridge in said one module to open said valve.

4. The method of claim 1 wherein said module is oriented so as to maintain a substantially zero or slightly negative head at said ink jet.

5. Ink jet apparatus comprising:

a first ink handling module including an ink supply path adapted to communicate with a reservoir, a bubble trap chamber coupled to said ink supply path and an outlet path from said bubble trap chamber;

coupling means coupled said outlet path;

a second ink handling module including an ink supply path coupled to said coupling means, a bubble trap chamber coupled to said ink supply path and an outlet path from said bubble trap chamber;

an ink jet coupled to said outlet path of said second module;

said first module having a different orientation than said second module so as to permit said bubble trap of said first module to trap bubbles at one extremity thereof while said bubble trap in said second module is substantially filled with ink.

6. The ink jet apparatus of claim 5 wherein said bubble trap chamber of said first module includes a vent at one elevated extremity of said bubble trap chamber.

7. The ink jet apparatus of claim 5 wherein said bubble trap chamber of said first module includes an elongated level sensor extending vertically.

8. The ink jet apparatus of claim 5 wherein said first module is oriented relative to said second module so as to maintain a substantially zero or slightly negative head at said jet.

9. The ink jet apparatus of claim 5 wherein said first module and said second module are substantially identical.

10. The ink jet apparatus of claim 5 wherein each said bubble trap chamber of said first module and said second module includes a vent, said vent of said first module being elevated.

11. The ink jet apparatus of claim 5 wherein each said bubble trap chamber of said first module and said second module includes an elongated level sensor, said sensor of said first module extending vertically.

12. The ink jet apparatus of claim 5 wherein each said ink supply path of each said module includes a valve for preventing the outflow of ink, said ink in said first module adapted to be opened by and in response to the presence of a reservoir, said valve in said second module being opened in response to a simulated reservoir member.

* * * * *